United States Patent [19]

Bussi et al.

[11] 4,152,915

[45] May 8, 1979

[54] HALOGENATED POLYCONDENSATES OF FATTY ALCOHOL-ACIDS FOR AQUEOUS METAL-WORKING FLUIDS AND METHOD OF MACHINING A METAL WITH SAID FLUIDS

[75] Inventors: Giancarlo Bussi; Pierpaolo Baradel, both of Trieste, Italy

[73] Assignee: Aquila S.p.A., Trieste, Italy

[21] Appl. No.: 916,046

[22] Filed: Jun. 14, 1978

[30] Foreign Application Priority Data

Jun. 17, 1977 [IT] Italy .............................. 24828 A/77

[51] Int. Cl.$^2$ .................... B21B 45/02; B11C 3/00; C10M 3/14; C10M 3/24
[52] U.S. Cl. ......................................... 72/42; 252/34; 252/41; 252/49.3; 260/404; 260/407; 260/408; 544/107
[58] Field of Search .................... 252/34, 41, 49.3; 72/42; 260/404, 407, 408, 413 R, 413 S; 544/106, 107

[56] References Cited

U.S. PATENT DOCUMENTS

| 2,202,328 | 5/1940 | Basel ............................... 260/404 X |
| 2,935,474 | 5/1960 | Kirkpatrick et al. .............. 252/34 X |
| 3,220,233 | 11/1965 | Thomsen et al. ............... 252/32.5 X |

*Primary Examiner*—W. J. Shine
*Attorney, Agent, or Firm*—Haseltine, Lake & Waters

[57] ABSTRACT

Halogenated polycondensates of fatty alcohol-acids are prepared by the following steps:
 a. polycondensation of said fatty alcohol-acid in a solvent,
 b. halogenation of the polycondensate obtained in step (a)
 c. salification of the halogenated polycondensate obtained in step (b) by an alkaline and/or an amine and/or ammonium base.

The polycondensates may also be esterifired with a mineral acid.

The products are used in aqueous solutions for metal working.

18 Claims, No Drawings

HALOGENATED POLYCONDENSATES OF FATTY ALCOHOL-ACIDS FOR AQUEOUS METAL-WORKING FLUIDS AND METHOD OF MACHINING A METAL WITH SAID FLUIDS

The present invention, concerns products useful in the working of metals such as processes for the removal of chips of material, such as, for example, milling or drilling (cutting operations) or with processes for deformation, without the removal of chips of material, such as rolling, wiredrawing, drawing, for example. More particularly the invention concerns chemical compounds which, in aqueous solution, constitute bases for the formulation of fluids for the working of metals. These bases can be used alone or, more commonly, after having been mixed with additives intended to enhance one or more particular functions of said bases; these additives can be added to the solution in variable quantities.

It is known that aqueous fluids for the working of metals should possess a large number of properties. The most important are certainly lubricating power, anti-corrosion power, but also biodegradability. Other properties may appear secondary, but are of equal importance for the user: inability to form foams or gums during use, non-toxicity, absence of odor, stability of the solutions; finally, it is expedient that these products not be too expensive.

There are numerous fluids available on the market; all possess the properties previously mentioned to different degrees. Many of these solutions, are not, in fact, aqueous solutions, but emulsions of oils in water. The principal characteristic of these fluids is that they comprise compositions containing a large number of constituents, each one possessing a particular property necessary to the quality of the fluid.

Many of these fluids, sold under the generic term "synthetics for machining of metals" are aqueous solutions containing from 30 to 70% of the primary active material such as condensates of alkylene oxides, soaps, foam and corrosion inhibitors, etc. These products are generally not very biodegradable; they further impose on the user a certain number of limitations to conserve their solubility and maintain their particular properties. In addition, this type of product does not possess high-pressure properties.

The applicants have already invented new bases for aqueous fluids for the working of metals; said bases possess to a sufficient degree the above-mentioned properties; in particular, the lubricating power is high.

These bases described, for example, in Italian Pat. No. 995,981, comprise alkaline salts soluble in water and/or amine salts soluble in water, and/or ammonium salts soluble in water, of phosphoric mono- and/or di-esters of fatty alcohols and/or fatty alcohol-acids, the carbon chains of said esters containing chlorine atoms.

The formulas of these products are the following:

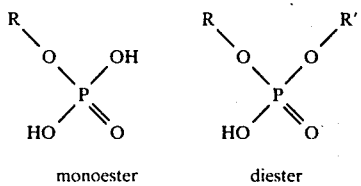

monoester  diester

The R and R' radicals, which may be the same or different, contain between 10 and 20 carbon atoms and contain chlorine atoms as well.

These esters can be obtained from a fatty alcohol or an alcohol containing an acid function such as ricinoleic acid of the formula:

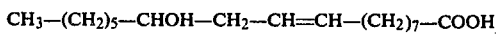

If this alcohol-acid is used as starting material, the esters obtained by esterification, chlorination and salification, as described in the above-cited patent, have the following formulas:

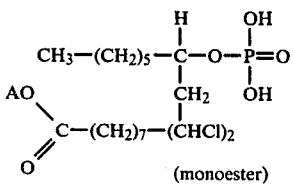
(monoester)

and

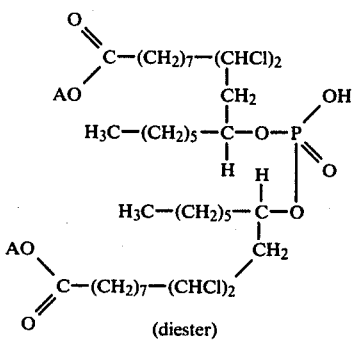
(diester)

in which A represents the cation of an alkaline base, an amine or ammonium.

Pursuing their work on lubrication in metal machining, the applicants have discovered new products capable of being used in the formulation of aqueous fluids and possessing very interesting lubricating properties.

The object of the present invention is to provide new bases for aqueous fluids intended for working of metals, said bases possessing elevated lubricating properties.

Consequently the invention has as its object, as new industrial products, alkaline salts and/or amine salts and/or ammonium salts of at least one polycondensate of fatty alcohol-acids whose carbon chain contains from 10 to 22 carbon atoms as well as halogen atoms, primarily chlorine.

It also has as its object, alkaline salts and/or amine salts and/or ammonium salts of esters of a mineral acid and of at least one polycondensate of fatty alcohol-acid whose carbon chain contains from 10 to 22 carbon atoms as well as halogen atoms, especially chlorine.

Another object of the invention is the application of new bases for aqueous fluids intended for the working of metals of at least one alkaline salt, and/or amine salt, and/or ammonium salt of at least one polycondensate of a fatty alcohol-acid, whose carbon chain contains from 10 to 22 carbon atoms as well as halogen atoms and especially chlorine, optionally in mixture with at least one alkaline salt and/or amine salt, and/or ammonium salt of at least one ester of a mineral acid and of at least one polycondensate of a fatty alcohol-acid whose carbon chain contains from 10 to 22 carbon atoms as well as halogen atoms, especially chlorine. By polycondensate, within the meaning of the application, is meant the product obtained by condensation of at least two molecules of fatty alcohol-acid. For example when the fatty alcohol-acid is ricinoleic acid, the following polycondensates are obtained:

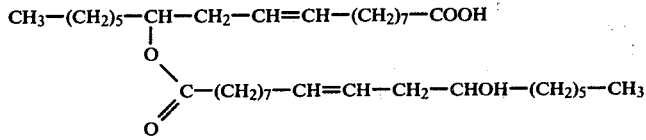

henceforth called "dimer".

The alcohol and acid functions remaining on the molecule can still react with other molecules of the fatty alcohol-acid; in this way heavier and heavier polycondensates are obtained, known hereafter as "trimer", "polymer", etc.

These polycondensates can be obtained by any appropriate method. The applicants used a condensation in benzene as solvent-xylenes, benzene or heptane can be used equally well—in the presence of para-toluenesulfonic acid in low concentration. This polycondensation can take place at the normal boiling temperature of the solvent (80° C. for benzene for example) or below (at 60° C. in heptane for example). It is known that polycondensations rarely lead to chemically pure products; during the formation of the polycondensates of the application, there is generally obtained a mixture of dimer, trimer, . . . polymers; this mixture has average properties equivalent to those of one or the other of the components (dimer, trimer . . . ). The progress of the reaction can be followed by free acid number, the increase of the carbonyl band attributable to the ester function in the infrared spectrum, the decrease in hydroxyl number, etc. The term polycondensate in the sense of the application therefore covers not only the dimer, the trimer, or pure polymers but also mixtures of these different products.

In order to form bases for aqueous fluids intended for the machining of metals, the polycondensates are salified alone or in mixture with other polycondensates, in order to form their alkaline salts and/or their amine salts and/or their ammonium salts. The salification of these products can be effected with the aid of an alkaline base (soda, potash, lithia, for example) or with an amine (morpholine or a trialkanolamine such as triethanolamine, for example) or with ammonia. In general an excess of the basic solution is used, and may be more than two times the stoichiometric quantity, especially in the case of weak bases, (triethanolamine or diethanolamine, for example). Then solutions are obtained which possess very good lubricating properties, as will be described in the examples.

It is necessary to halogenate the products in order to confer on them high-pressure properties. The halogens which may be used are, for example, chlorine and bromine, chlorine being preferred.

In the case of chlorine, the applicants have effected successful chlorinations with gaseous chlorine at ambient temperature (20° to 40° C.) and in various solvents such as heptane, chloroform or acetic acid. These chlorination reactions are generally simple and quantitative.

In order to augment this property or any other property of the bases thus obtained, one can add to them additives such as:
emulsifiers to improve the stability,
anti-foaming agents,
solubilizing agents to increase the solubility of these bases in water,
anti-gumming agents, etc.

In particular, the water solubility of these bases can be insufficient. One can therefore provide for using these with solubilizing agents or for chemically modifying these bases by making their esters with acids or anhydrides of mineral acids, such as for example orthophosphoric acid or phosphoric anhydride. This modification brings to the base product the solubility which would be eventually missing. It can be completely or only partially stoichiometric.

This esterification can be effected in the usual manner, for example by mixing one or more of the halogenated polycondensates with the anhydride of a mineral acid or with a mineral acid, particularly phosphoric anhydride or orthophosphoric acid. In order to avoid, if necessary, a more extended polycondensation of the halogenated fatty alcohol-acid which can be produced during this esterification, it may be necessary, before this esterification, to block the acid functions remaining on the polycondensate or the mixture of polycondensates: this blocking can be effected by an esterification of these acid functions by an alcohol, methyl alcohol for example, in the presence of a catalyst (for example sulfuric acid); at the end of the reaction, the solution is neutralized in any appropriate manner and the alcoholic ester or esters are extracted with the aid of a solvent.

After esterification in the presence of an anhydride or a mineral acid with one or more of the halogenated polycondensates optionally esterified with an alcohol, the reaction products are successively washed with solutions until neutral; the different layers are separated, then the free acids containing the methyl ester functions are saponified by an alcoholic alkaline solution, then extracted with a solvent.

As a result of these different phases, there are obtained mineral esters, particularly orthophosphoric esters, of one or more starting halogenated polycondensates. These esters, in the form of their alkaline salts and/or amine salts and/or ammonium salts have, in addition to lubricating properties, a satisfactory solubility in water.

In addition, it is also possible to add to the halogenated polycondensates (in the form of their alkaline and/or amine and/or ammonium salts), with the object of improving the quality of the aqueous solutions which will be used in the machining of metals, at least one of the following products:
alkaline salts and/or amine salts and/or ammonium salts of halogenated mineral esters, especially chlorinated orthophosphoric esters of a fatty alcohol-acid containing from 10 to 22 carbon atoms, in particular with monomeric ricinoleic acid, alkaline salts and/or amine salts and/or ammonium salts of the condensation product of a fatty acid and of an amino carboxylic acid, such as described in Italian Pat. No. 995,980.

These different types of products are, in effect, capable of increasing the lubricating power of the solutions and/or of acting as surface-active agents.

The products intended for working of metals can be sold in the form of aqueous solutions containing from about 2 to about 70% of the active materials described above; in practice, the solutions are sold containing from about 5 to about 20% of active material; the user himself will effect the necessary dilutions of the commercial product, to obtain a commercial working product, generally containing less than 10% and commonly in the order of 2 to 10% of the active material. The working concentration of the so-called active material can vary between about 0.02 and 3%. In addition, it is possible to add to the present product in solution, such conventional additives as:

- anti-foaming additives,
- anti-gumming additives,
- bactericidal agents,
- anti-corrosion agents,
- perfume,
- coloring agents,
- agents modifying the physical properties, such as viscosity modifiers.

These different types of additives are well known to those skilled in the art.

Thus, silicones, esters and special soaps serve as anti-foaming additives.

Phenols, quaternary ammonium salts, nitro derivatives of alcohols, thiocarbonates, thiocarbamates, and triazines can be used as bactericidal agents.

Alkaline nitrites, phosphates, borates, etc. are known as anti-corrosive agents.

One can also use coloring agents, and perfumes, as well as the very numerous anti-gumming additives on the market.

As agents modifying the physical properties, there may be mentioned, for example, those which modify the viscosity such as alcohols, glycols, etc.

The properties of these fluids can be evaluated by different methods. In the examples which follow, the applicants have evaluated the properties of solutions of triethanolamine salts of the active ingredients of the following concentration:

- active product: 0.5% by weight,
- triethanolamine: 0.75% by weight,
- water: 98.75% by weight.

The solubility is evaluated according to a solubility index using the following scale:

- 0 = insolubility,
- 1 = slightly stable emulsion,
- 2 = stable emulsion,
- 3 = perfectly soluble.

The tendency to foaming is evaluated according to an index using the following scale (American Standard VV-C 846a):

- 0 = appearance of foam at the end of 15 minutes,
- 1 = no foam at the end of 15 minutes,
- 2 = no foam at the end of 15 seconds.

The anti-corrosive power is evaluated by standard IP 125.

The lubricating power (Load-Wear Index) is evaluated using ASTM Standard D 2783.

The following examples illustrate the invention using ricinoleic acid; however, they are provided as non-limiting examples.

EXAMPLE 1

This example concerns the synthesis and the properties of chlorinated polycondensates of ricinoleic acid. In particular there is prepared:

the chlorinated monomer having the theoretical formula:

a product whose average properties are close to those of the chlorinated dimer—of the theoretical formula:

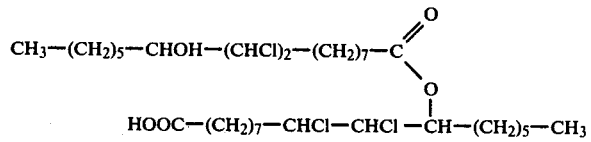

a product whose average properties are close to those of the chlorinated trimer of the theoretical formula:

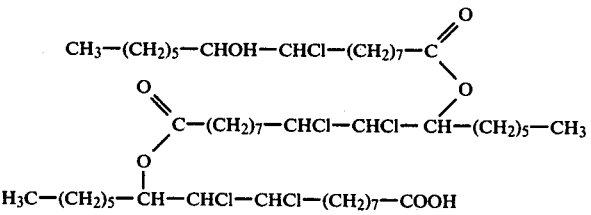

a polymer with a molecular mass greater than 1100.

In order to prepare the "dimer" and the "trimer", the ricinoleic acid monomer is placed in solution in benzene, at 80° C., in the presence of para-toluenesulfonic acid (concentration from 0.3 to 2.5% by weight). According to the quantity of water eliminated, one can obtain principally the dimer or the trimer, a condensation between two molecules liberating one molecule of water. Practically, one obtains almost always a mixture of the different structures described above, a mixture whose average composition can be ascertained by measuring the acidity, for example.

In order to determine the degree of polycondensation of the product and to ascertain its average composition, the acid value (in mg KOH/g of the product) is measured before salification with triethanolamine.

The chlorination is effected on the monomer, the dimer, or the trimer by reaction of these products with chlorine at ambient temperature and in a solvent.

In Table I which follows, the results obtained in the synthesis of these polycondensates are given.

TABLE I

| Property Ex. | Acid Number Theor. | Acid Number Found | % Chlorine by Weight Theor. | % Chlorine by Weight Found | Product Obtained |
|---|---|---|---|---|---|
| A | 152 | 125 | — | — | A = chlorinated monomer |
| B | 77 | 63 | 19.8 | 15.0 | B = product whose characteristics approach those of the chlorinated dimer |
| C | 77–52 | 51 | 19.9 | 21.0 | C = a mixture of chlorinated dimer-trimer |
| D | <52 | 43 | 20.0 | 25.5 | D = product whose characteristics approach those of the chlorinated trimer |

These different products are tested, as indicated above, in the form of their triethanolamine (TEA) salts in aqueous solution (0.5% product, 0.75% TEA, 98.75% water).

The results of the different tests are reported in Table II.

TABLE II

| Product | Solubility | Foaming (American Standard VV-C 846a) | Corrosion (IP 125) | LWI ASTM D2783 |
|---|---|---|---|---|
| A | 3 | 0 | 1/0-0 | 55 |
| B | 1–2 | 1 | 0/0-0 | 50 |
| C | 1–2 | 0 | 12/0-0 | 84 |
| D | 1 | 0 | 0/0-0 | 109 |

From this table, it can be seen that the polycondensates have properties as good as or better than the chlorinated monomer to serve as bases for aqueous fluids. It can be stated in particular that the higher the condensation, the better the high-pressure lubricating power (LWI). On the other hand, solubility develops in the opposite way, this being due to the greater and greater condensation of the product; but this property can be easily improved, as has been seen previously, either by the addition of solubilizing agents, or by the formation of mineral esters of said product.

EXAMPLE 2

This example illustrates the increase in solubility in water of the products of Example 1, by formation of the orthophosphoric esters of these products. With this object, products B and D of Example 1 are converted as follows:

Formation of orthophosphoric esters

One mole of phosphoric anhydride is reacted with 3 moles of product in heptane at 60° C. At the end of the reaction, all of the phosphoric anhydride being dissolved, the product is washed to neutralization with a solution of $NaHCO_3$ and the different phases are separated.

Table III lists the different tests effected on these phosphated products, in solution in water in the form of their triethanolamine salts (same concentration as in Example 1).

TABLE III

| PRODUCT | Solubility | Foaming | Corrosion IP 125 | LWI ASTM D 2783 |
|---|---|---|---|---|
| Phosphoric ester of Product B | 3 | 0 | 12/0-0 | 39 |
| Phosphoric ester of Product D | 1–2 | 0 | 4/0-0 | 104 |
| Phosphated non-chlorinated trimer (1) | 3 | 1 | 0/0-0 | 25 |
| Phosphated non-chlorinated dimer (2) | 3 | 0 | 0/0-0 | 21 |
| Phosphated polymer (molecular mass > 1100) (3) | 2 | 0 | 2/0-0 | 35 |
| Phosphated chlorinated polymer (4) | 1 | 0 | 20/0-0 | 117 |

In this Table, the results are given for the following products:

(1)=orthophosphoric ester of a non-chlorinated trimer, (2)=orthophosphoric ester of a non-chlorinated dimer, (3)=orthophosphoric ester of a non-chlorinated polymer having a molecular mass greater than 1100, (4)=orthophosphoric ester of the above polymer, but chlorinated.

From the results obtained, the following conculsions may be drawn:

the chlorinated products have a lubricating power (LWI) much higher than the corresponding non-chlorinated product, and a good anti-corrosion power, the lubricating power (LWI) increases with the condensation: in the order of lubricating power (LWI) the product can be classified as follows:

phosphated chlorinated polymer>phosphated chlorinated trimer>phosphated chlorinated dimer.

This order is also found for the phosphated non-chlorinated products.

If the solubility of the phosphoric esters of chlorinated polycondensates is compared with that of non-phosphated chlorinated polycondensates (Table II), it can be seen that "phosphatation" permits increasing the solubility, as much for polycondensates of low molecular mass (dimers and trimers, compare Table III and Table II) as for those of higher molecular mass (compare the last two lines in Table III). One could therefore form orthophosphoric esters, as esters with another mineral acid, to solubilize the polycondensates, if their solubility is not good enough.

EXAMPLE 3

This example illustrates the application of the aqueous fluids for the machining of metals of product C of Example I.

This product is used in the form of its triethanolamine salt in water in the following proportions by weight:
chlorinated polymer: 20%
TEA: 30%,
water: 50%.

The lubricating properties of this formula after dilution to the usual working concentration were evaluated. The results are reported in Table IV.

TABLE IV

| EXPERIMENT | Concentration of the active product in the aqueous solution | RESULT |
|---|---|---|
| Corrosion IP 125 | 4% by weight | 0/0-0 |
| 4-ball method (ASTM D 2783) Weld Point LWI | 5% by weight | 620 kgs 150 |

The results confirm the ability of the chlorinated polycondensates to form aqueous fluids for the working of metals.

We claim:

1. A composition comprising at least one salt of an acid selected from the group consisting of (1) polycondensates of a fatty alcohol-acid, (2) mineral esters of polycondensates of a fatty alcohol-acid, and (3) mixtures thereof, wherein the carbon chain of said fatty alcohol-acid contains halogen atoms and from 10 to 22 carbon atoms and wherein said salt is selected from the group consisting of alkaline salts, amine salts, ammonium salts and mixtures thereof.

2. The composition according to claim 1 wherein said halogen is chlorine.

3. The composition according to claim 1 or 2 wherein said fatty alcohol-acid is ricinoleic acid.

4. The composition according to claim 1 or 2 wherein said mineral esters are ortho-phosphoric esters.

5. The composition according to claim 4 wherein said fatty alcohol-acid is ricinoleic acid.

6. A process for the preparation of a salt comprising the steps of polycondensation of a fatty alcohol-acid in a solvent to form a polycondensate, halogenation of said polycondensate to form a halogenated polycondensate, and salification of said halogenated polycondensate with a base selected from the group consisting of alkaline bases, amines and ammonia.

7. The process according to claim 6 which further comprises esterification of at least a part of said polycondensate with a mineral acid selected from the group consisting of phosphoric anhydride and orthophosphoric acid.

8. The process according to claim 7 which further comprises the step of esterifying said polycondensate with an alcohol prior to esterification with the mineral acid.

9. The process according to any one of claims 6-8 wherein said fatty alcohol-acid is ricinoleic acid, said halogenation is effected with chlorine, and said salification is effected with an alkaline base or ammonia.

10. The product obtained by the process of any one of claims 6-8.

11. The product obtained by the process of claim 9.

12. An aqueous solution of at least one product according to claim 10.

13. An aqueous solution of the composition according to claim 1.

14. The aqueous solution according to claim 13 containing 2 to 70% by weight of the salt.

15. The aqueous solution according to claim 13 containing 0.02 to 3% by weight of the salt.

16. The aqueous solution according to claim 13 wherein said salt is selected from the group consisting of sodium, lithium, potassium, trialkanolamine and morpholine salts.

17. An aqueous solution according to any one of claims 13-16 containing at least one additive selected from the group consisting of anti-foaming agents, bactericides, anti-corrosion agents, perfumes, coloring agents, anti-gumming agents and viscosity modifiers.

18. In a method of machining a metal in the presence of an aqueous lubricant, the improvement which comprises using as the lubricant an aqueous solution of at least one salt of (1) polycondensates of a fatty alcohol-acid, (2) mineral esters of polycondensates of a fatty alcohol-acid and (3) mixtures thereof, wherein the carbon chain of said fatty alcohol-acid contains halogen atoms and from 10 to 22 carbon atoms and wherein said salt is selected from the group consisting of alkaline salts, amine salts, ammonium salts and mixtures thereof.

* * * * *